(12) United States Patent
Tahara et al.

(10) Patent No.: US 12,308,178 B2
(45) Date of Patent: May 20, 2025

(54) MULTILAYER CERAMIC ELECTRONIC DEVICE AND MANUFACTURING METHOD OF THE SAME

(71) Applicant: TAIYO YUDEN CO., LTD., Tokyo (JP)

(72) Inventors: Mikio Tahara, Tokyo (JP); Tomoaki Nakamura, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 139 days.

(21) Appl. No.: 18/351,029

(22) Filed: Jul. 12, 2023

(65) Prior Publication Data

US 2024/0021375 A1   Jan. 18, 2024

(30) Foreign Application Priority Data

Jul. 14, 2022 (JP) .................. 2022-112874

(51) Int. Cl.
*H01G 4/30* (2006.01)
*C04B 35/468* (2006.01)
*H01G 4/008* (2006.01)
*H01G 4/012* (2006.01)
*H01G 4/12* (2006.01)

(52) U.S. Cl.
CPC ........... *H01G 4/30* (2013.01); *C04B 35/4682* (2013.01); *H01G 4/008* (2013.01); *H01G 4/012* (2013.01); *H01G 4/1227* (2013.01)

(58) Field of Classification Search
CPC ........ H01G 4/008; H01G 4/012; H01G 4/232; H01G 4/30
See application file for complete search history.

(56) References Cited

U.S. PATENT DOCUMENTS

| 2012/0019982 A1 | 1/2012 | Sasaki |
| 2017/0186539 A1* | 6/2017 | Masuda ............. H01G 2/06 |
| 2018/0162780 A1 | 6/2018 | Kaneda et al. |

FOREIGN PATENT DOCUMENTS

| JP | 2012-44151 A | 3/2012 |
| JP | 2018-98327 A | 6/2018 |

* cited by examiner

*Primary Examiner* — Nathan Milakovich
(74) *Attorney, Agent, or Firm* — CHEN YOSHIMURA LLP

(57) ABSTRACT

A multilayer ceramic electronic device includes a multilayer chip and external electrodes opposite to each other in a second direction orthogonal to a first direction in which internal electrode layers face and include a ceramic grain. $0.722 \times \ln(W \times T/E) - 5.75 + (\alpha_E - \alpha_O) + (t/12) \leq 6.02$ is satisfied, when a dimension of the multilayer chip in the first direction is T (μm), a dimension of the multilayer chip in a third direction orthogonal to the first direction and the second direction is W (μm), a number of the internal electrode layers is E, a thermal expansion coefficient of the external electrodes is $\alpha_E$ ($\times 10^{-6}$/K), a thermal expansion coefficient of the multilayer chip is $\alpha_O$ ($\times 10^{-6}$/K), and a maximum value of a thickness of the external electrodes on a main face in the first direction is t (μm).

9 Claims, 6 Drawing Sheets

MULTILAYER CERAMIC ELECTRONIC DEVICE AND MANUFACTURING METHOD OF THE SAME

FIELD

A certain aspect of the present disclosure relates to a multilayer ceramic electronic device and a manufacturing method of the multilayer ceramic electronic device.

BACKGROUND

In a multilayer ceramic electronic device such as a multilayer ceramic capacitor, a multilayer chip and external electrodes may be simultaneously fired by applying a metal paste to a multilayer structure before firing, and heating (see, for example, Patent Documents 1 and 2).

PRIOR ART

Patent Document

Document 1: Japanese Patent Application Publication No. 2018-98327
Document 2: Japanese Patent Application Publication No. 2012-44151

SUMMARY OF THE INVENTION

When the multilayer chip and the external electrodes are fired at the same time, the stress due to the difference in thermal expansion coefficient between the multilayer chip and the external electrodes tends to concentrate. As a result, cracks may occur at the interfaces between the multilayer chip and the external electrodes.

The present invention has been made in view of the above problems, and an object of the present invention is to provide a multilayer ceramic electronic device capable of suppressing the occurrence of cracks and a manufacturing method of the same.

According to a first aspect of the embodiments, there is provided a multilayer ceramic electronic device including: a multilayer chip having a plurality of dielectric layers and a plurality of internal electrode layers, the plurality of internal electrode layers facing each other with the plurality of dielectric layers respectively interposed therebetween; and a pair of external electrodes that are provided on two end faces of the multilayer chip opposite to each other in a second direction orthogonal to a first direction in which the plurality of internal electrode layers face each other, extend to a main face of the multilayer chip positioned at an end in the first direction, and include a ceramic grain, wherein $0.722 \times \ln(W \times T/E) - 5.75 + (\alpha_E - \alpha_0) + (t/12) \leq 6.02$ is satisfied, when a dimension of the multilayer chip in the first direction is T (μm), a dimension of the multilayer chip in a third direction orthogonal to the first direction and the second direction is W (μm), a number of the plurality of internal electrode layers is E, a thermal expansion coefficient of the pair of external electrodes is $\alpha_E$ ($\times 10^{-6}$/K), a thermal expansion coefficient of the multilayer chip is $\alpha_0$ ($\times 10^{-6}$/K), and a maximum value of a thickness of the pair of external electrodes on the main face in the first direction is t (μm).

In the multilayer ceramic electronic device, the ceramic grain may be barium titanate or calcium zirconate.

In the multilayer ceramic electronic device, E may be larger than 10, when a dimension of the multilayer chip in the second direction is L, the L is 1000 μm, and the W is 500 μm.

In the multilayer ceramic electronic device as claimed in claim 1, E may be larger than 50, when a dimension of the multilayer chip in the second direction is L, the L is 1600 μm, and the W is 800 μm.

In the multilayer ceramic electronic device, E may be larger than 15, when a dimension of the multilayer chip in the second direction is L, the L is 2100 μm, and the W is 2500 μm.

In the multilayer ceramic electronic device, E may be larger than 40, when a dimension of the multilayer chip in the second direction is L, the L is 3200 μm, and the W is 1600 μm.

In the multilayer ceramic electronic device, E may be larger than 100, when a dimension of the multilayer chip in the second direction is L, the L is 3200 μm, and the W is 2500 μm.

In the multilayer ceramic electronic device, E may be larger than 125, when a dimension of the multilayer chip in the second direction is L, the L is 4500 μm, and the W is 3200 μm.

According to a second aspect of the embodiments, there is provided a manufacturing method of a multilayer ceramic electronic device including: forming an internal electrode pattern on each of ceramic green sheets; forming a multilayer structure by stacking the ceramic green sheets on which the internal electrode pattern is formed; applying a conductive paste on two end faces of the multilayer structure opposite to each other; and by firing the multilayer structure and the conductive paste, forming a multilayer chip and a pair of external electrodes, the multilayer chip having a plurality of dielectric layers and a plurality of internal electrode layers, the plurality of internal electrode layers facing each other with the plurality of dielectric layers respectively interposed therebetween, wherein $0.722 \times \ln(W \times T/E) - 5.75 + (\alpha_E - \alpha_0) + (t/12) \leq 6.02$ is satisfied, when a dimension of the multilayer chip in a first direction in which the plurality of internal electrode layers face each other is T (μm), a dimension of the multilayer chip in a third direction orthogonal to the first direction and a second direction in which the pair of external electrodes are opposite to each other is W (μm), a number of the plurality of internal electrode layers is E, a thermal expansion coefficient of the pair of external electrodes is $\alpha_E$ ($\times 10^{-6}$/K), a thermal expansion coefficient of the multilayer chip is $\alpha_0$ ($\times 10^{-6}$/K), and a maximum value of a thickness of the pair of external electrodes on the main face in the first direction is t (μm).

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION

Hereinafter, an exemplary embodiment will be described with reference to the accompanying drawings.

Figure 1:
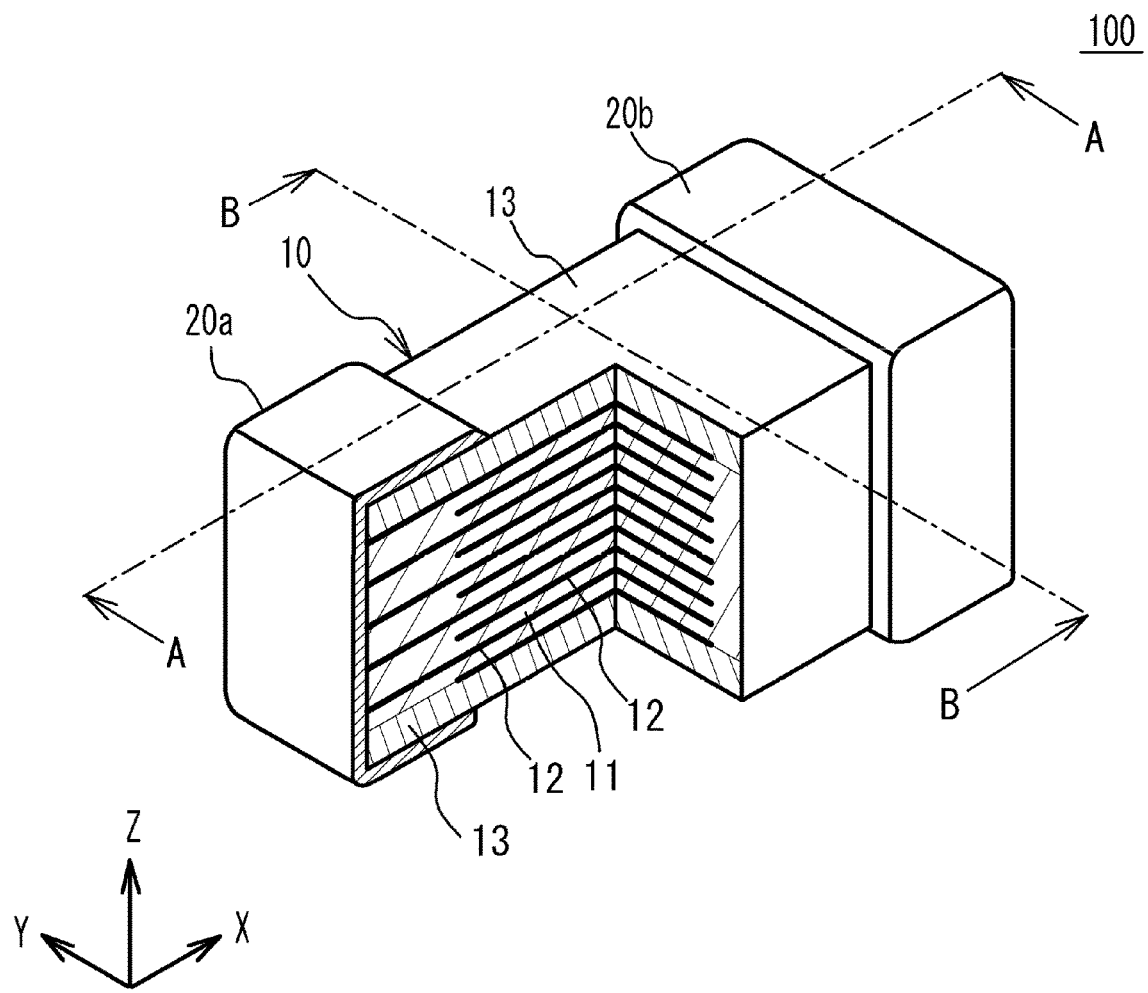
FIG. 1 is a partial cross-sectional perspective view of a multilayer ceramic capacitor.
Figure 2:
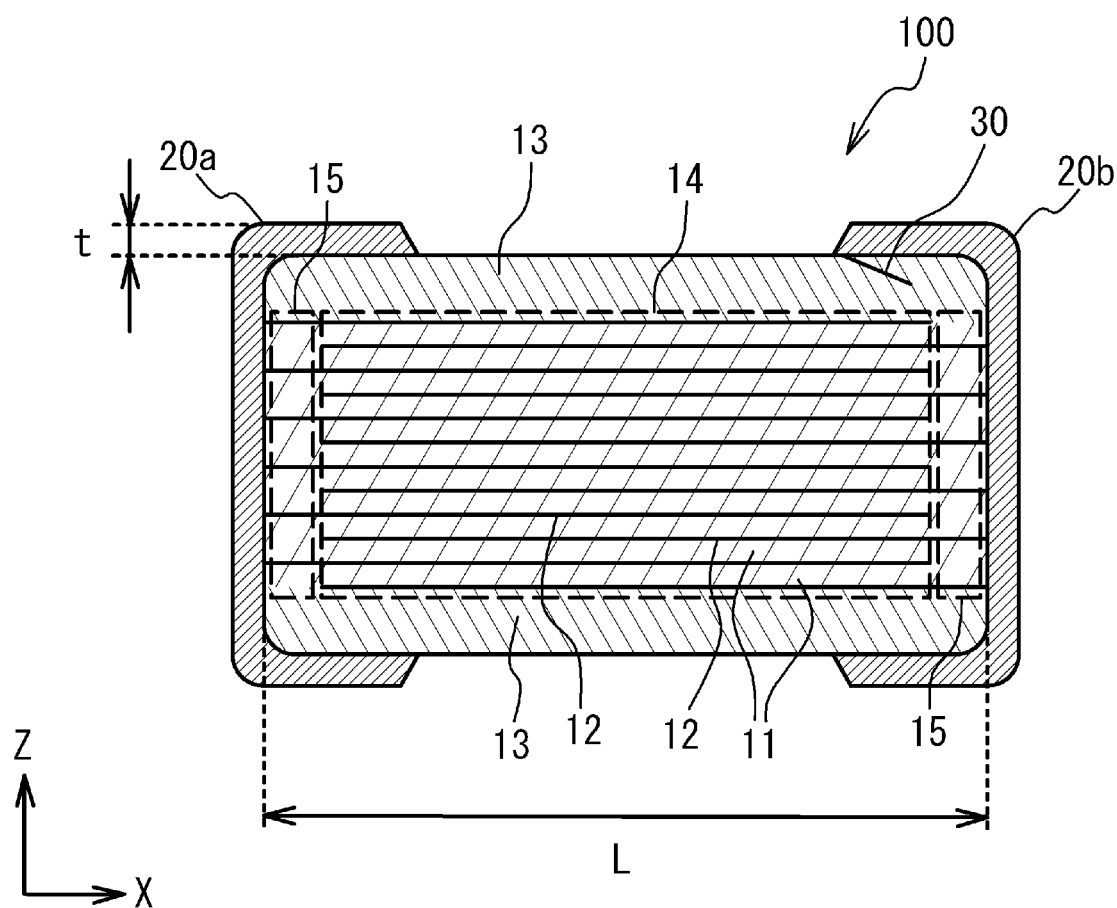
FIG. 2 is a cross-sectional view taken along line A-A in FIG. 1.
Figure 3:
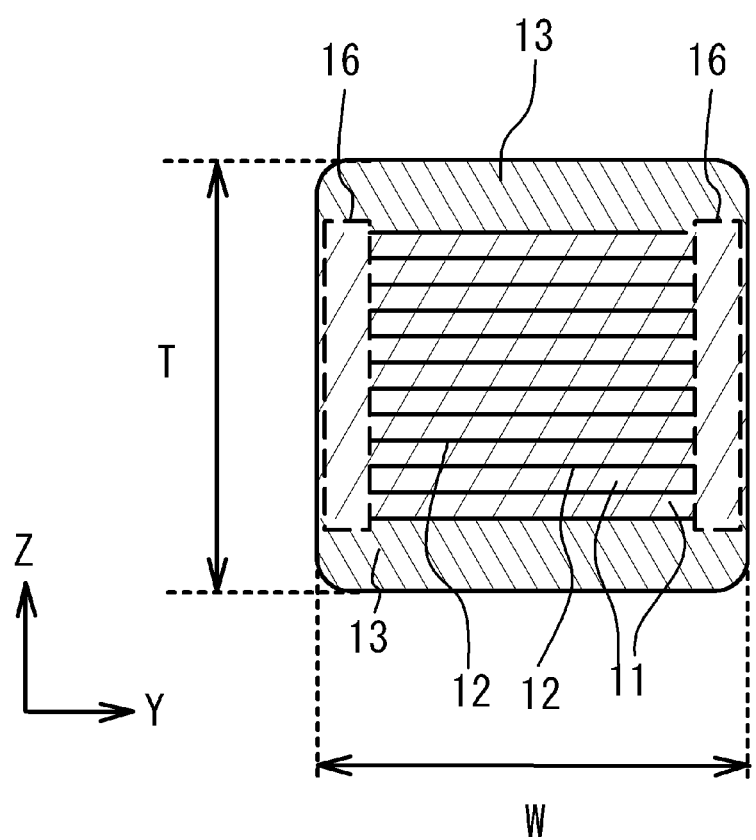
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two end faces of the multilayer chip 10 opposite to each other. Among four faces other than the two end faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

In FIG. 1 to FIG. 3, a Z-axis direction (first direction) is a first direction in which the plurality of internal electrode layers 12 face each other, which is the stacking direction and the upper face and the lower face of the multilayer chip 10 are opposite to each other. An X-axis direction (second direction) is the length direction of the multilayer chip 10, the direction in which the two end faces of the multilayer chip 10 are opposite to each other, and the direction in which the external electrodes 20a and 20b are opposite to each other. A Y-axis direction (third direction) is the width direction of the internal electrode layers, and is the direction in which two of the four side faces of the multilayer chip 10, excluding the two end faces, are opposite to each other.

The multilayer chip 10 has a structure in which dielectric layers 11 containing a ceramic material acting as a dielectric and internal electrode layers 12 mainly composed of metal are alternately stacked. In other words, the multilayer chip 10 includes the internal electrode layers 12 facing each other and the dielectric layers 11 sandwiched between the internal electrode layers 12. The edges in the direction in which each internal electrode layer 12 extends are alternately exposed at a first end face provided with the external electrode 20a of the multilayer chip 10 and a second end face provided with the external electrode 20b. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 may be the same as the main component of the dielectric layer 11 or may be different from the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \le x \le 1$, $0 \le y \le 1$, $0 \le z \le 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

Additives may be added to the dielectric layer 11. As additives to the dielectric layer 11, an oxide of magnesium (Mg), manganese (Mn), molybdenum (Mo), vanadium (V), chromium (Cr), or a rare earth element (yttrium (Y), samarium (Sm), europium (Eu), gadolinium (Gd), terbium (Tb), dysprosium (Dy), holmium (Ho), erbium (Er), thulium (Tm) and ytterbium (Yb), or an oxide of cobalt (Co), nickel (Ni), lithium (Li), boron (B), sodium (Na), potassium (K) or silicon (Si), or a glass including cobalt, nickel, lithium, boron, sodium, potassium or silicon. The thickness of the dielectric layer 11 is, for example, 1.0 µm or more and 3.0 µm or less, 2.5 µm or more and 4.5 µm or less, 4.0 µm or more and 6.0 µm or less, or 5.5 µm or more and 7.5 µm or less.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them. The thickness of the internal electrode layer 12 is, for example, 0.8 µm or more and 1.2 µm or less, 1.0 µm or more and 1.4 µm or less, 1.2 µm or more and 1.6 µm or less, or 1.4 µm or more and 1.8 µm or less.

The main component of the external electrodes 20a and 20b is metal such as nickel, copper or the like. The external electrodes 20a and 20b contain a co-material for controlling sintering behavior during firing. The co-material is ceramic grains for delaying sintering and shrinkage of the external electrodes 20a and 20b during firing. The co-material is not particularly limited as long as it is made of ceramic. For example, barium titanate, barium zirconate, or the like can be used as the co-material.

The external electrodes 20a and 20b are fired at the same time as the multilayer chip 10. One or two or more plated layers may be provided on the surfaces of the external electrodes 20a and 20b. For example, the plated layer is a Cu-plated layer, a Ni-plated layer, an Sn-plated layer, or the like.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin section 15. The section where the internal electrode layers 12 connected to the external electrode 20b face each other with no internal electrode layer 12 connected to the external electrode 20a interposed therebetween is another end margin section 15. That is, the end margin section 15 is a section where the internal electrode layers 12 connected to one of the external electrodes face each other with no internal electrode layer 12 connected to the other of the external electrodes interposed therebetween. The end margin section 15 is a section where no capacity is generated.

As illustrated in FIG. 3, in the multilayer chip 10, a section from one of the two side faces of the multilayer chip 10 to lateral side edges of the internal electrode layers 12 is referred to as a side margin section 16. That is, each of the side margin sections 16 is a section that covers the lateral side edges, extending toward one of the side faces of the multilayer structure, of the stacked internal electrode layers 12. The side margin section 16 is a section where no capacity is generated.

The multilayer chip 10 can be fired by heat-treating a multilayer structure of ceramic green sheets for forming the dielectric layers 11 and internal electrode patterns for forming the internal electrode layers 12. The external electrodes 20a and 20b can be fired by heat-treating the external electrode conductive paste for forming the external electrodes. When the external electrodes 20a, 20b and the multilayer chip 10 are fired at the same time, stress due to the difference in thermal expansion coefficient between the external electrodes 20a and 20b and the multilayer chip 10 tends to concentrate. As a result, cracks 30 may occur at the interfaces between the external electrodes 20a and 20b and the multilayer chip 10, as illustrated in FIG. 2.

The crack 30 is considered to be caused by the compressive stress in the vicinity of the tips of the external electrodes 20a and 20b and the tensile stress in the portions without the external electrodes 20a and 20b, which are caused by the difference in thermal expansion coefficient between the external electrodes 20a and 20b and the multilayer chip 10 in a cooling zone of the firing process. In the cooling zone, since the external electrodes 20a and 20b contract faster than the multilayer chip 10 so that the external electrodes 20a and 20b clamp the multilayer chip 10, the crack 30 occurs at the tips of the external electrodes 20a and 20b and directly below the external electrodes 20a and 20b on the peripheral surface of the multilayer chip 10 (upper face, lower face and two side faces of the multilayer chip 10). It is considered that this is because, in the case of metals and resins, cracks are less likely to occur due to plastic deformation of the material itself, but ceramics have a high Young's modulus and are difficult to deform, so cracks are more likely to occur than other materials.

The stress due to the difference in thermal expansion coefficients in the cooling zone during the firing process can be considered as follows in the following formulas (1) and (2).

$$\text{Compressive stress} \sigma : \sigma = \varepsilon \times E (E:\text{amount of strain}, E: \text{Young's modulus}) \quad (1)$$

$$\text{Strain amount} \varepsilon : \varepsilon = \alpha \times \Delta T \times t (\alpha:\text{thermal expansion coefficient}, \Delta T:\text{temperature}, t:\text{sample length}) \quad (2)$$

It is considered that the Young's modulus E is replaced by the denseness of the external electrodes 20a and 20b, the thermal expansion coefficient α is replaced by the difference in thermal expansion coefficient between the external electrodes 20a and 20b and the multilayer chip 10, the temperature ΔT is replaced by the firing temperature, and t is replaced by the maximum thickness of the external electrodes. Reducing these parameters reduces the stress a. Therefore, it is considered that the generation of the crack 30 can be suppressed by optimizing these parameters.

First, it is thought that the generation of the crack 30 can be suppressed by reducing the density of the external electrodes 20a and 20b. However, if the density of the external electrodes 20a and 20b is deteriorated, there are concerns about reliability and wettability. Therefore, the denseness of the external electrodes 20a and 20b is considered to be a parameter that needs to be fixed.

Next, if the external electrodes 20a and 20b are mixed with many co-materials and additives to lower the thermal expansion coefficient, the stress will be reduced. Therefore, by increasing the amount of the co-material, adjusting the amount of additives such as alumina or zirconia, and the amount of additives such as silicon nitride ($Si_3N_4$) or silicon carbide (SiC) having a small thermal expansion coefficient and a large Young's modulus, the thermal expansion coefficients of the external electrodes 20a and 20b can be controlled.

Next, it is thought that the occurrence of the crack 30 can be suppressed by lowering the firing temperature. However, lowering the firing temperature raises concerns about electrical properties, reliability, wettability, or the like. Therefore, the firing temperature is considered to be a parameter that needs to be fixed.

Next, thinning the external electrodes 20a and 20b leads to a reduction in stress. The stress a can be reduced by controlling the coating thickness of the conductive paste for forming the external electrodes 20a and 20b and stabilizing the film thickness level. Therefore, it is considered that the crack 30 can be suppressed by thinning the external electrodes 20a and 20b.

By controlling and quantifying the thermal expansion coefficient difference "a" and the maximum thickness "t" of the external electrodes 20a and 20b, the thermal expansion coefficient difference between the external electrodes 20a and 20b and the multilayer chip 10 can be taken into account. This makes it possible to grasp the risk of the crack 30 and design in a region where the crack 30 does not occur. Since the coefficient of thermal expansion of the multilayer chip 10 is affected by the ratio of the internal electrode layers 12, the number of the internal electrode layers 12 is also taken into consideration.

As described above, according to the intensive research of the present inventors, it has been found that the larger the thermal expansion coefficient of the external electrodes 20a and 20b is, the higher the occurrence rate of the crack 30 is. And it has been found that the larger the thickness of the external electrodes 20a and 20b is, the higher the occurrence rate of the crack 30 is. These results show that in the above formulas (1) and (2), when the thermal expansion coefficient "α" and the maximum thickness "t" of the external electrodes 20a and 20b increase, the compressive stress increases and the crack 30 is likely to occur.

It is considered that the parameter of the likelihood of the crack 30 being generated is determined by the relationship between the compressive stress and the multilayer chip 10. If this relationship can be indexed, the index can be reflected in the design. Therefore, the crack index X has been derived.

First, the crack 30 is more likely to occur as the multilayer chip 10 is larger, and the crack 30 is more likely to occur as the number of internal electrode layers 12 increases. Therefore, a structural index is expressed as W×T×W. However, as illustrated in FIG. 2 and FIG. 3, W is the dimension (μm) of the multilayer chip 10 in the Y-axis direction. T is the dimension (μm) of the multilayer chip 10 in the Z-axis direction. E is the number of the internal electrode layers 12. Using this structural index, the correction value of the thermal expansion coefficient due to the form factor and the structural factor shall be taken into account in the calculation.

Also, even if the composition of the external electrodes 20a and 20b is the same as each other, the thicker the external electrodes 20a and 20b are, the larger the gap between the multilayer chip 10 and the external electrodes 20a and 20b becomes, and the crack 30 is more likely to occur. Therefore, the correction value based on the maximum thickness "t" of the external electrodes 20a and 20b is considered in the calculation.

Taking the above into consideration, the crack index X, which indicates the likelihood of the crack 30 occurring, can be expressed by the following formula (3). However, "$\alpha_E$" represents the thermal expansion coefficient ($\times 10^{-6}$/K) of the external electrode. "$\alpha_0$" represents the thermal expansion coefficient ($\times 10^{-6}$/K) of the multilayer chip 10; "t" represents the maximum thickness (μm) of the external electrodes 20a and 20b on the main surface of the multilayer chip 10.

$$\text{Crack index } X = 0.722 \times \ln(W \times T/E) - 5.75 + (\alpha_E - \alpha_0) + (L/12) \quad (3)$$

The inventors have found that the crack occurrence rate can be reduced when the crack index X is 6.02 or less. Therefore, the multilayer ceramic capacitor 100 according to the present embodiment satisfies the condition that the crack index X is 6.02 or less. Thereby, the crack occurrence rate in the multilayer ceramic capacitor 100 can be reduced.

In order to sufficiently reduce the occurrence rate of the crack 30, the crack index X is preferably 5.76 or less, more preferably 5.50 or less.

It is preferable that E>10 when the dimension of the multilayer chip 10 in the X-axis direction is L (μm) and L=1000 μm and W=500 μm. It is preferable that E>50 when L=1600 μm and W=800 μm. It is preferable that E>15 when L=2100 μm and W=2500 μm. It is preferable that E>40 when L=3200 μm and W=1600 μm. It is preferable that E>100 when L=3200 μm and W=2500 μm. It is preferable that E>125 when L=4500 μm and W=3200 μm. Note that the dimension L in the X-axis direction is illustrated in FIG. 2.

"t" in the above formula (3) is, for example, 10 μm or more and 15 μm or less, 15 μm or more and 20 μm or less, or 20 μm or more and 30 μm or less.

Figure 4:
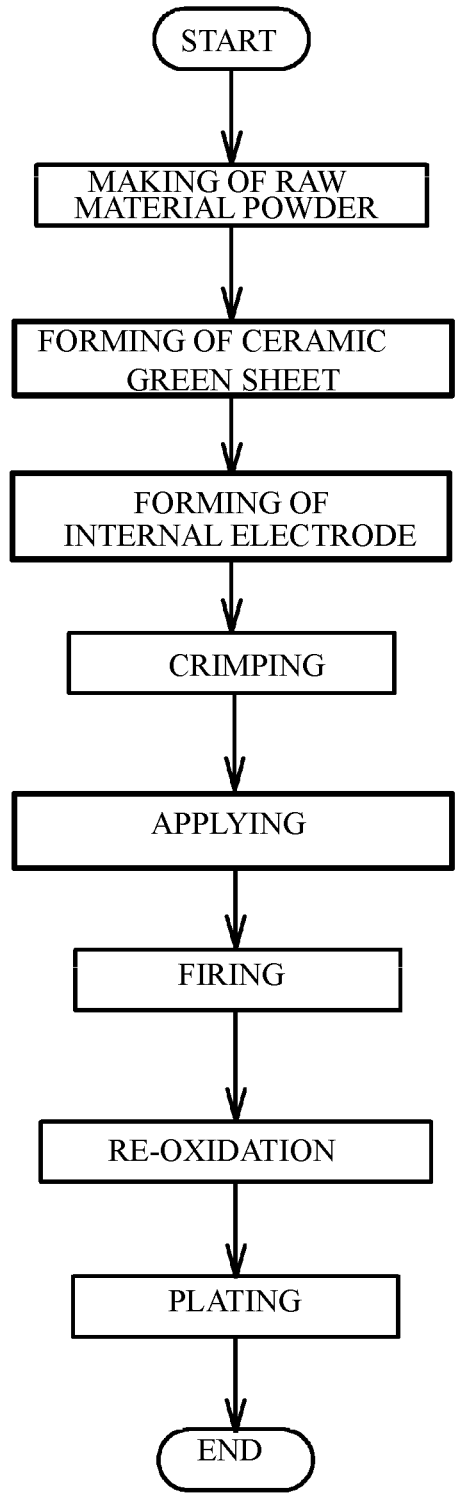
FIG. 4 is a flowchart of a manufacturing method of a multilayer ceramic capacitor.

Next, a description will be given of a manufacturing method of the multilayer ceramic capacitors 100. FIG. 4 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of magnesium (Mg), manganese (Mn), molybdenum (Mo), vanadium (V), chromium (Cr), or a rare earth element (yttrium (Y), samarium (Sm), europium (Eu), gadolinium (Gd), terbium (Tb), dysprosium (Dy), holmium (Ho), erbium (Er), thulium (Tm) and ytterbium (Yb), or an oxide of cobalt (Co), nickel (Ni), lithium (Li), boron (B), sodium (Na), potassium (K) or silicon (Si), or a glass including cobalt, nickel, lithium, boron, sodium, potassium or silicon. Mainly, $SiO_2$ acts as a sintering assistant.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the grain diameter of the resulting ceramic power may be adjusted by combining the crushing and classifying. With the processes, a dielectric material is obtained.

(Forming of ceramic green sheet) Next, a binder such as polyvinyl butyral (PVB) resin, an organic solvent such as ethanol or toluene, and a plasticizer are added to the resulting dielectric material and wet-blended. With use of the resulting slurry, a ceramic green sheet 52 is formed on a base material 51 by, for example, a die coater method or a doctor blade method, and then dried. The base material 51 is, for example, PET (polyethylene terephthalate) film.

Figure 5A:
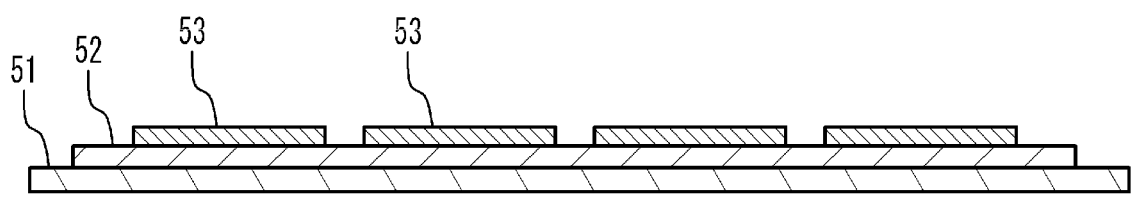
FIG. 5A and FIG. 5B illustrate a stacking process of a first embodiment.

(Forming of internal electrode) Next, as illustrated in FIG. 5A, an internal electrode pattern 53 is formed on the ceramic green sheet 52. In FIG. 5A, as an example, four parts of the internal electrode pattern 53 are formed on the ceramic green sheet 52 and are spaced from each other. The ceramic green sheet 52 on which the internal electrode pattern 53 is formed is a stack unit. A metal paste of the main component metal of the internal electrode layer 12 is used as the internal electrode pattern 53. The forming method of the internal electrode pattern 53 is such as a printing, a sputtering, a vapor deposition or the like.

Figure 5B:
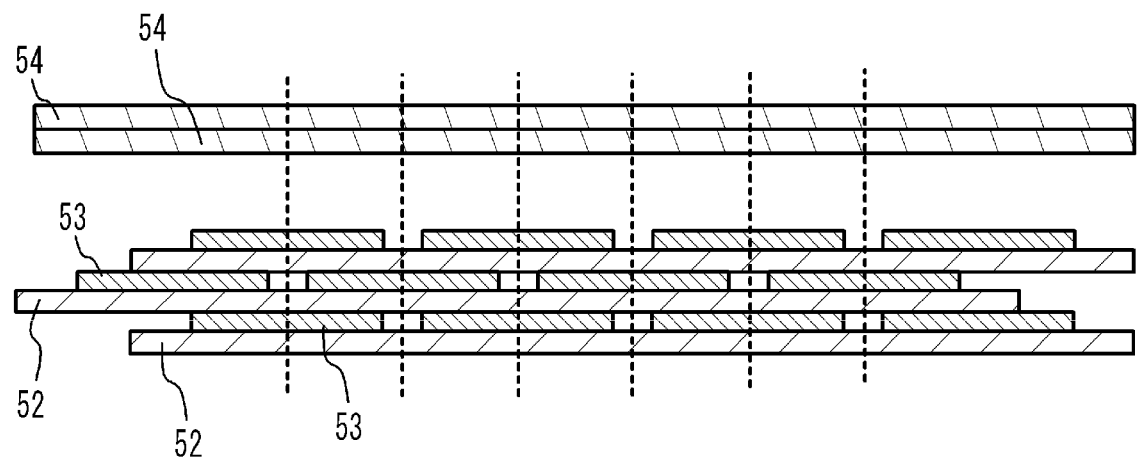

(Crimping Process) Next, the ceramic green sheets 52 are peeled from the base materials 51. As illustrated in FIG. 5B, the stack units are stacked. A predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 5B, the multilayer structure is cut along a dotted line. The components of the cover sheet 54 may be the same as those of the ceramic green sheet 52. Additives of the cover sheet 54 may be different from those of the ceramic green sheet 52.

(Applying process) The binder is removed from the resulting ceramic multilayer structure in $N_2$ atmosphere. After that, conductive paste for external electrode to be the external electrodes 20a and 20b is applied to the resulting ceramic multilayer structure by a dipping method.

(Firing process) The resulting ceramic multilayer structure is fired for 5 to 10 minutes in a reductive atmosphere having an oxygen partial pressure of $10^{-12}$ to $10^{-9}$ MPa in a temperature range of 1160 degrees C. to 1280 degrees C.

(Re-oxidation process) In order to return oxygen to the partially reduced main phase of the dielectric layers 11 fired in a reducing atmosphere, a thermal process is performed at about 1000° C. in a mixed gas of $N_2$ and water vapor, or in a normal atmosphere at 500° C. to 700° C. to the extent that the internal electrode layers 12 are not oxidized. This process is called a re-oxidation process. Through the above processes, the multilayer ceramic capacitor 100 is completed.

(Plating process) After that, by a plating process, plated layers of copper, nickel, tin or the like may be formed on the external electrodes 20a and 20b.

In the manufacturing method according to the present embodiment, by adjusting the dimensions and each material so that the crack index $X=0.722\times\ln(W\times T/E)-5.75+(\alpha_E-\alpha_0)+(L/12)$ is 6.02 or less, the crack occurrence rate in the multilayer ceramic capacitor 100 can be reduced.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

A ceramic green sheet for forming the dielectric layer, an internal electrode pattern for forming the internal electrode layer, and an external electrode conductive paste for forming external electrodes were prepared. Barium titanate powder was used as the main component ceramic powder in the ceramic green sheets. Nickel powder was used as the main component metal powder in the internal electrode pattern.

Regarding the conductive paste for external electrodes, in condition No. 1, the amount of resin binder was 10 wt %, the amount of solvent was 25 wt %, and the amount of ceramic powder (main component is $BaTiO_3$) as a common material was 25 wt %, when the amount of Ni powder was assumed to be 100 wt %. In condition No. 2, the amount of resin binder was 10 wt %, the amount of solvent was 25 wt %, and the amount of ceramic powder (main component is $BaTiO_3$) as a common material was 15 wt %, when the amount of Ni powder was assumed to be 100 wt %. In condition No. 3, the amount of resin binder was 10 wt %, the amount of solvent was 25 wt %, and the amount of ceramic powder (main component is $BaTiO_3$) as a common material was 35 wt %, when the Ni powder was assumed 100 wt %.

Regarding the conductive paste for external electrodes, in condition No. 4, the amount of resin binder was 10 wt %, the amount of solvent was 25 wt %, and the amount of ceramic powder (main component is $CaZrO_3$) as a common material was 25 wt %, when the amount of Ni powder was assumed 100 wt %. In condition No. 5, the amount of resin binder was 10 wt %, the amount of solvent was 25 wt %, and the amount of ceramic powder (main component was $CaZrO_3$) as a common material was 15 wt %, when the amount of Ni powder was assumed 100 wt %. In condition No. 6, the amount of resin binder was 10 wt %, the amount of solvent was 25 wt %, and the amount of ceramic powder (main component is $CaZrO_3$) as a common material was 35 wt %, when the amount of Ni powder was assumed 100 wt %.

The thermal expansion coefficient of the external electrodes was adjusted by adjusting the ratio of ceramic powder and a small amount of additives. In condition No. 1, the thermal expansion coefficient 1 was $15.7\times10^{-6}$/K. In condition No. 2, the thermal expansion coefficient of 2 was $15.9\times10^{-6}$/K. In condition No. 3, the thermal expansion coefficient was $15.5\times10^{-6}$/K. In condition No. 4, the thermal expansion coefficient was $13.7\times10^{-6}$/K. In condition No. 5, the thermal expansion coefficient was $14.2\times10^{-6}$/K. In condition No. 6, the thermal expansion coefficient was $13.0\times10^{-6}$/K.

In order to produce 1005 shape V thickness (L: 1.0 mm, W: 0.5 mm, T: 0.5 mm), 2125 shape G thickness (L: 2.0 mm, W: 1.25 mm, T: 1.25 mm), 3216 shape L thickness (L: 3.2 mm, W: 1.6 mm, T: 1.6 mm), 4532 shape M thickness (L: 4.5 mm, W: 3.2 mm, T: 2.5 mm), using a screen adapted to each shape, a conductive paste for internal electrodes was printed on the surfaces of the ceramic green sheets to form internal electrode patterns.

The ceramic green sheets on which the internal electrode patterns were formed in this way were stacked at the specified number of layers (1005 shape V thickness: 15 layers and 35 layers, 2125 shape G thickness: 35 layers, 3216 shape L thickness: 70 layers, and 4532 shape M thickness: 150 layers). After that, the stacked ceramic green sheets was sandwiched and crimpled by ceramic green sheets on which internal electrode patterns were not formed (no printing is performed). Thus, a unfired ceramic multilayer structure was made. After that, chamfering and removal of the binder were performed. As described above, the external electrode paste in which the amount of ceramic powder was changed to 15 wt % to 35 wt % was dipped on both end surfaces of the ceramic sintered body while adjusting the thickness by adjusting the dipping conditions and dilution. After the dipping, firing was performed in a reducing atmosphere at 1300° C., and the crack occurrence rate was confirmed by polishing analysis.

The results are shown in Tables 1 and 2. For each condition, the number of samples was set to 20, and the ratio of the number of samples in which crack generation was confirmed (crack occurrence rate (%)) was examined. There was a tendency that the higher the coefficient of thermal expansion of the external electrode was, the higher the crack occurrence rate was. Also, there was a tendency that the larger the thickness of the external electrode was, the higher the crack occurrence rate was. In Tables 1 and 2, the numerical value represented by "%" was the crack occurrence rate.

TABLE 1

| EXTERNAL ELECTRODE | EXTERNAL ELECTRODE THERMAL EXPANSION COEFFICIENT | EXTERNAL ELECTRODE THICKNESS | SHAPE 4532 THICKNESS M | 3216 L | 2125 G | 1005 V | 1005 V |
|---|---|---|---|---|---|---|---|
| BaTiO$_3$ | ($\times 10^{-6}$/K) | (μm) | NUMBER OF LAYERS 150 | 70 | 35 | 35 | 15 |
| No. 1  25 wt % | 15.7 | 10 | — | — | — | 0% | 0% |
| | | 15 | — | 65% | 45% | 0% | 15% |
| | | 20 | 85% | 85% | 65% | 0% | 30% |
| | | 25 | 100% | 100% | 85% | — | — |
| | | 30 | 100% | 100% | — | — | — |
| No. 2  15 wt % | 15.9 | 10 | — | — | — | 0% | 0% |
| | | 15 | — | 70% | 40% | 0% | 35% |
| | | 20 | 100% | 100% | 90% | 5% | 40% |
| No. 3  35 wt % | 15.5 | 10 | — | — | — | 0% | 0% |
| | | 15 | — | 55% | 50% | 0% | 0% |
| | | 20 | 70% | 80% | 55% | 0% | 20% |

TABLE 2

| EXTERNAL ELECTRODE | EXTERNAL ELECTRODE THERMAL EXPANSION COEFFICIENT | EXTERNAL ELECTRODE THICKNESS | SHAPE 4532 THICKNESS M | 3216 L | 2125 G | 1005 V | 1005 V |
|---|---|---|---|---|---|---|---|
| CaZrO$_3$ | ($\times 10^{-6}$/K) | (μm) | NUMBER OF LAYERS 150 | 70 | 35 | 35 | 15 |
| No. 4  25 wt % | 13.7 | 10 | — | — | — | 0% | 0% |
| | | 15 | — | 0% | 0% | 0% | 0% |
| | | 20 | 0% | 0% | 0% | 0% | 0% |
| | | 25 | 0% | 25% | 0% | — | — |
| | | 30 | 10% | 30% | — | — | — |
| No. 5  15 wt % | 14.2 | 10 | — | — | — | 0% | 0% |
| | | 15 | — | 0% | 0% | 0% | 0% |
| | | 20 | 0% | 20% | 0% | 0% | 0% |
| No. 6  35 wt % | 13 | 10 | — | — | — | 0% | 0% |
| | | 15 | — | 0% | 0% | 0% | 0% |
| | | 20 | 0% | 0% | 0% | 0% | 0% |

In the above formulas (1) and (2), the compressive stress a was expressed by $\alpha \times \Delta T \times L \times E$. In the experimental results in Tables 1 and 2, the results confirms that when the thermal expansion coefficient "a" and the external electrode thickness "L" increased, the compressive stress increased and cracks were more likely to occur.

Next, we calculated the difference in thermal expansion coefficient between the external electrode and the material and the multilayer chip. Table 3 shows the results.

TABLE 3

| EXTERNAL ELECTRODE CERAMIC MAIN COMPONENT | EXTERNAL ELECTRODE CERAMIC MAIN COMPONENT | THERMAL EXPANSION COEFFICIENT ($\times 10^{-6}$/K) | THERMAL EXPANSION COEFFICIENT DIFFERENCE ($\times 10^{-6}$/K) |
|---|---|---|---|
| BaTiO$_3$ | 15 wt % | 15.9 | 3.9 |
| | 25 wt % | 15.7 | 3.7 |
| | 35 wt % | 15.5 | 3.5 |
| CaZrO$_3$ | 15 wt % | 14.2 | 2.2 |
| | 25 wt % | 13.7 | 1.7 |
| | 35 wt % | 13 | 1 |
| MATERIAL OF MULTILAYER CHIP (BaTiO$_3$) | | 12 | — |

Next, the crack index X was calculated for each condition. The results are shown in Tables 4 and 5. The relationship between the crack index X calculated from the product design (external electrode paste composition, multilayer chip composition, external electrode thickness, product shape, number of internal layers) and the actual crack occurrence rate was plotted. The results are shown in FIG. In Tables 4 and 5, the crack index X is the numerical value up to the second decimal place described below "Shape".

TABLE 4

| EXTERNAL ELECTRODE | EXTERNAL ELECTRODE THERMAL EXPANSION COEFFICIENT | EXTERNAL ELECTRODE THICKNESS | SHAPE | | | | |
|---|---|---|---|---|---|---|---|
| | | | 4532 | 3216 | 2125 | 1005 | 1005 |
| | | | \multicolumn{5}{c}{THICKNESS} |
| | | | M | L | G | V | V |
| | | | \multicolumn{5}{c}{NUMBER OF LAYERS} |
| BaTiO$_3$ | ($\times 10^{-6}$/K) | (μm) | 150 | 70 | 35 | 35 | 15 |
| No. 1  25 wt % | 15.7 | 10 | — | — | — | 5.19 | 5.80 |
| | | 15 | — | 7.43 | 6.93 | 5.60 | 6.21 |
| | | 20 | 7.47 | 7.84 | 7.34 | 6.02 | 6.63 |
| | | 25 | 7.89 | 8.26 | 7.76 | — | — |
| | | 30 | 8.3 | 8.68 | — | — | — |
| No. 2  15 wt % | 15.9 | 10 | — | — | — | 5.39 | 6.00 |
| | | 15 | — | 7.63 | 7.13 | 5.80 | 6.41 |
| | | 20 | 7.67 | 8.04 | 7.54 | 6.22 | 6.83 |
| No. 3  35 wt % | 15.5 | 10 | — | — | — | 4.99 | 5.60 |
| | | 15 | — | 7.23 | 6.73 | 5.40 | 6.01 |
| | | 20 | 7.27 | 7.64 | 7.14 | 5.82 | 6.43 |

TABLE 5

| EXTERNAL ELECTRODE | EXTERNAL ELECTRODE THERMAL EXPANSION COEFFICIENT | EXTERNAL ELECTRODE THICKNESS | SHAPE | | | | |
|---|---|---|---|---|---|---|---|
| | | | 4532 | 3216 | 2125 | 1005 | 1005 |
| | | | \multicolumn{5}{c}{THICKNESS} |
| | | | M | L | G | V | V |
| | | | \multicolumn{5}{c}{NUMBER OF LAYERS} |
| CaZrO$_3$ | ($\times 10^{-6}$/K) | (μm) | 150 | 70 | 35 | 35 | 15 |
| No. 4  25 wt % | 13.7 | 10 | — | — | — | 3.19 | 3.80 |
| | | 15 | — | 5.43 | 4.93 | 3.60 | 4.21 |
| | | 20 | 5.47 | 5.84 | 5.34 | 4.02 | 4.63 |
| | | 25 | 5.89 | 6.26 | 5.76 | — | — |
| | | 30 | 6.30 | 6.68 | — | — | — |
| No. 5  15 wt % | 14.2 | 10 | — | — | — | 3.69 | 4.30 |
| | | 15 | — | 5.93 | 5.43 | 4.10 | 4.71 |
| | | 20 | 5.97 | 6.34 | 5.84 | 4.52 | 5.13 |
| No. 6  35 wt % | 13 | 10 | — | — | — | 2.49 | 3.10 |
| | | 15 | — | 4.73 | 4.23 | 2.90 | 3.51 |
| | | 20 | 4.77 | 5.14 | 4.64 | 3.32 | 3.93 |

Figure 6:
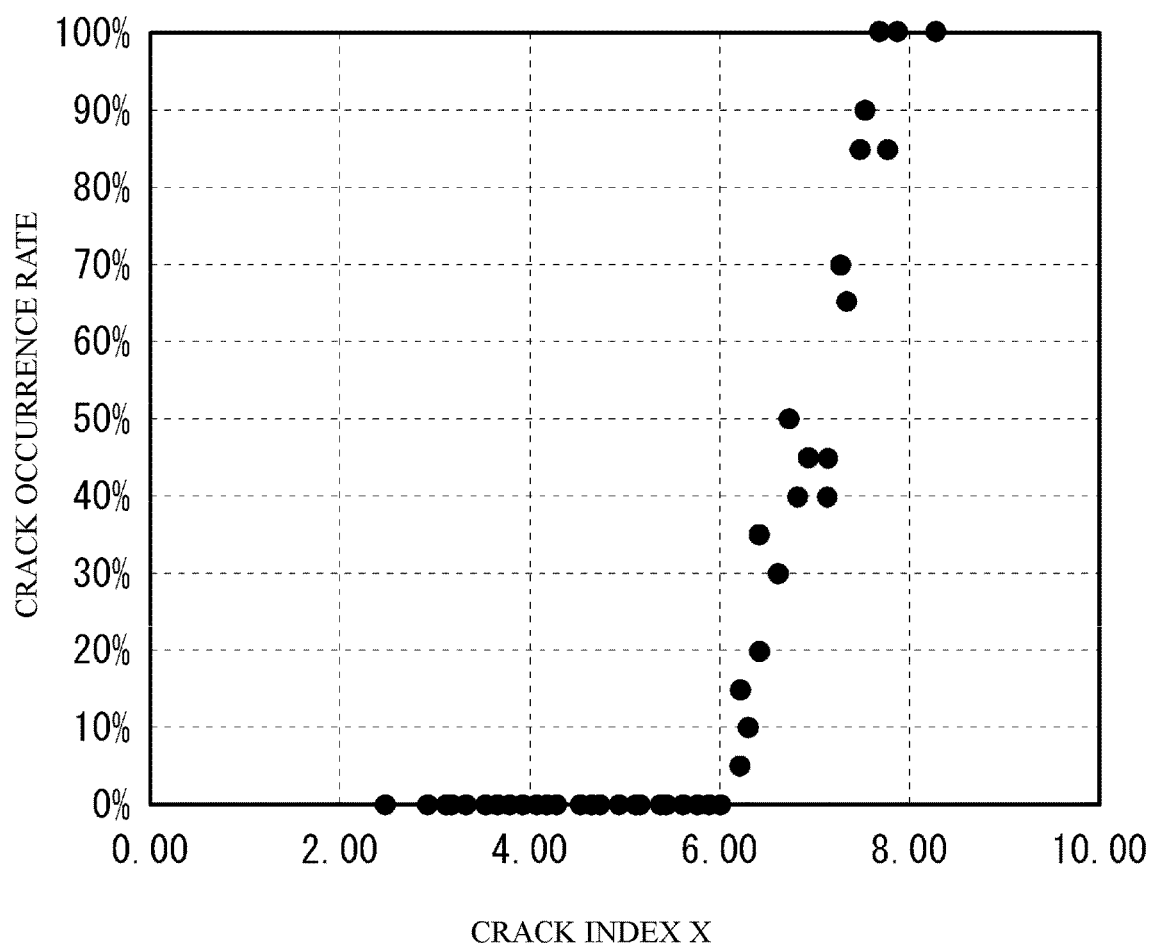
FIG. 6 illustrates a relationship between a crack index X and an actual crack occurrence rate.

From the results of Tables 4, 5, and FIG. 6, it has been found that the crack occurrence rate can be reduced if the crack index X satisfies X≤6.02.

Although the embodiments of the present invention have been described in detail, it is to be understood that the various change, substitutions, and alterations could be made hereto without departing from the spirit and scope of the invention.

What is claimed is:

1. A multilayer ceramic electronic device comprising:
a multilayer chip having a plurality of dielectric layers and a plurality of internal electrode layers, the plurality of internal electrode layers facing each other with the plurality of dielectric layers respectively interposed therebetween; and
a pair of external electrodes that are provided on two end faces of the multilayer chip opposite to each other in a second direction orthogonal to a first direction in which the plurality of internal electrode layers face each other, extend to a main face of the multilayer chip positioned at an end in the first direction, and include a ceramic grain,
wherein $0.722 \times \ln(W \times T/E) - 5.75 + (\alpha_E - \alpha_0) + (t/12) \leq 6.02$ is satisfied, when a dimension of the multilayer chip in the first direction is T (μm), a dimension of the multilayer chip in a third direction orthogonal to the first direction and the second direction is W (μm), a number of the plurality of internal electrode layers is E, a thermal expansion coefficient of the pair of external electrodes is $\alpha_E$ ($\times 10^{-6}$/K), a thermal expansion coefficient of the multilayer chip is $\alpha_0$ ($\times 10^{-6}$/K), and a maximum value of a thickness of the pair of external electrodes on the main face in the first direction is t (μm).

2. The multilayer ceramic electronic device as claimed in claim 1, wherein the ceramic grain is barium titanate or calcium zirconate.

3. The multilayer ceramic electronic device as claimed in claim 1, wherein E>10, when a dimension of the multilayer chip in the second direction is L, the L is 1000 μm, and the W is 500 μm.

4. The multilayer ceramic electronic device as claimed in claim 1, wherein E>50, when a dimension of the multilayer chip in the second direction is L, the L is 1600 μm, and the W is 800 μm.

5. The multilayer ceramic electronic device as claimed in claim 1, wherein E>15, when a dimension of the multilayer chip in the second direction is L, the L is 2100 μm, and the W is 2500 μm.

6. The multilayer ceramic electronic device as claimed in claim 1, wherein E>40, when a dimension of the multilayer chip in the second direction is L, the L is 3200 μm, and the W is 1600 μm.

7. The multilayer ceramic electronic device as claimed in claim 1, wherein E>100, when a dimension of the multilayer chip in the second direction is L, the L is 3200 μm, and the W is 2500 μm.

8. The multilayer ceramic electronic device as claimed in claim 1, wherein E>125, when a dimension of the multilayer chip in the second direction is L, the L is 4500 μm, and the W is 3200 μm.

9. A manufacturing method of a multilayer ceramic electronic device comprising:
  forming an internal electrode pattern on each of ceramic green sheets;
  forming a multilayer structure by stacking the ceramic green sheets on which the internal electrode pattern is formed;
  applying a conductive paste on two end faces of the multilayer structure opposite to each other; and
  by firing the multilayer structure and the conductive paste, forming a multilayer chip and a pair of external electrodes, the multilayer chip having a plurality of dielectric layers and a plurality of internal electrode layers, the plurality of internal electrode layers facing each other with the plurality of dielectric layers respectively interposed therebetween,
  wherein $0.722 \times \ln(W \times T/E) - 5.75 + (\alpha_E - \alpha_0) + (t/12) \leq 6.02$ is satisfied, when a dimension of the multilayer chip in a first direction in which the plurality of internal electrode layers face each other is T (μm), a dimension of the multilayer chip in a third direction orthogonal to the first direction and a second direction in which the pair of external electrodes are opposite to each other is W (μm), a number of the plurality of internal electrode layers is E, a thermal expansion coefficient of the pair of external electrodes is $\alpha_E$ ($\times 10^{-6}$/K), a thermal expansion coefficient of the multilayer chip is $\alpha_0$ ($\times 10^{-6}$/K), and a maximum value of a thickness of the pair of external electrodes on a main face in the first direction is t (μm).

* * * * *